(12) United States Patent
Leem

(10) Patent No.: US 11,347,936 B1
(45) Date of Patent: May 31, 2022

(54) SPREADSHEET SEARCH FUNCTIONALITY

(71) Applicant: International Business Machines Corporation, Armonk, NY (US)

(72) Inventor: Jin Leem, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/952,593

(22) Filed: Nov. 19, 2020

(51) Int. Cl.
*G06F 40/00* (2020.01)
*G06F 40/18* (2020.01)
*G06F 3/04845* (2022.01)
*G06F 16/93* (2019.01)

(52) U.S. Cl.
CPC .......... *G06F 40/18* (2020.01); *G06F 3/04845* (2013.01); *G06F 16/93* (2019.01)

(58) Field of Classification Search
CPC ......... G06F 40/18; G06F 3/0485; G06F 16/93
See application file for complete search history.

(56) References Cited

U.S. PATENT DOCUMENTS

| | | | |
|---|---|---|---|
| 9,805,015 B2 | 10/2017 | Singh | |
| 9,892,175 B2* | 2/2018 | Couris | G06F 16/9535 |
| 10,146,846 B2 | 12/2018 | Genochio | |
| 10,235,429 B2 | 3/2019 | Meehan | |
| 2002/0129053 A1* | 9/2002 | Chan | G06F 40/18 |
| | | | 715/213 |
| 2005/0273695 A1* | 12/2005 | Schnurr | H04W 24/00 |
| | | | 715/213 |
| 2009/0313537 A1* | 12/2009 | Fu | G06F 40/18 |
| | | | 715/212 |
| 2010/0083079 A1* | 4/2010 | Rapp | G06F 40/18 |
| | | | 715/212 |
| 2012/0137203 A1* | 5/2012 | Schodl | G06F 40/18 |
| | | | 715/215 |
| 2016/0357723 A1* | 12/2016 | Brissette | G06F 3/04817 |
| 2017/0212942 A1 | 7/2017 | Boileau | |

OTHER PUBLICATIONS

Selecting Items in a Sheet or Spreadsheet, from ApacheOpenOffice Wiki, Jul. 14, 2018, 4 pages (Retrieved https://wiki.openoffice.org/wiki/Documentation/OOo3_User_Guides/Getting_Started/Selecting_items_in_a_Spreadsheet). (Year: 2018).*

Google Sheets: Find and Replace with in a Range, by Alice Keeler, Dec. 8, 2015, 20 pages (retrieved from https://alsickeeler.com/2015/12/08/Google-sheets-find-and-replace-within-a-range/). (Year: 2015).*

* cited by examiner

*Primary Examiner* — Scott T Baderman
*Assistant Examiner* — Barbara M Level
(74) *Attorney, Agent, or Firm* — Brian Welle

(57) ABSTRACT

A value is received that is in at least one cell of a spreadsheet. The spreadsheet includes data across a plurality of rows and a plurality of columns. A subsection of the spreadsheet in which to search for the value is received. The subsection includes less than all columns and less than all rows. The subsection is searched for all cells that contain the value. All cells within the subsection that contain the value are provided.

18 Claims, 5 Drawing Sheets

SPREADSHEET SEARCH FUNCTIONALITY

BACKGROUND

An ability (and also a need) of organizations to gather, structure, and organize data is constantly growing. One common format of storing data for organization and analysis is in a two-dimensional spreadsheet that includes rows and columns that intersect at given cells, where, e.g., data of a given cell is related in some manner to data of other cells of a shared column and/or row of that given cell. These spreadsheets may include massive amounts of data, with, e.g., thousands of cells that include data as spread across hundreds of columns and rows.

SUMMARY

Aspects of the present disclosure relate to a method, system, and computer program product relating to providing search functionality for a spreadsheet. For example, the method includes receiving a value of at least one cell of a spreadsheet that includes data across a plurality of rows and a plurality of columns. The method also includes receiving a subsection of the spreadsheet in which to search for the value, where the subset includes less than all columns and less than all rows. The method also includes searching the subsection for all cells that contain the value. The method also includes providing all cells within the subsection that contain the value. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
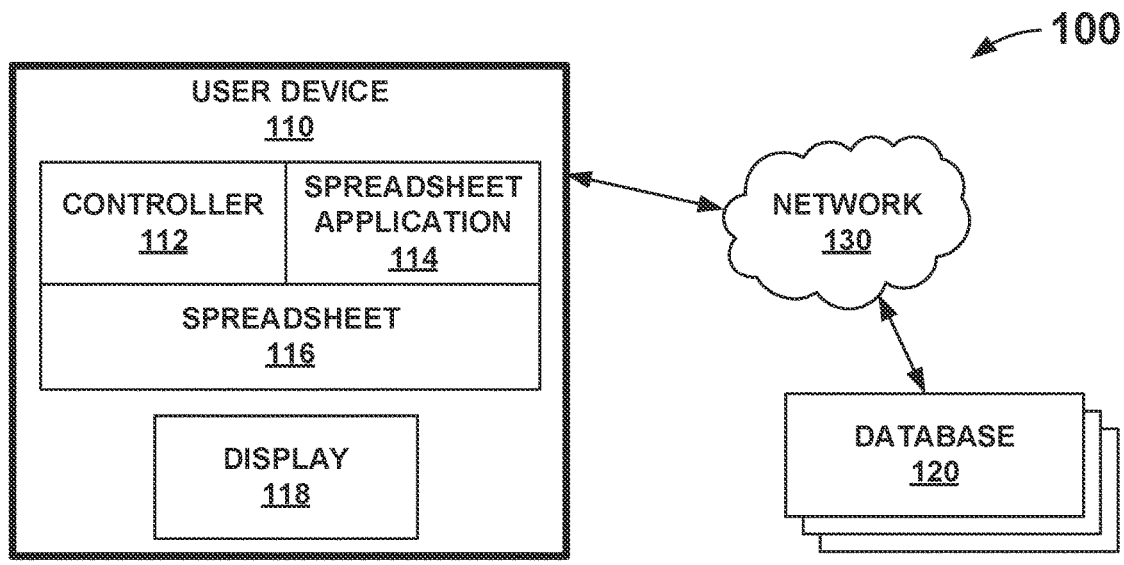
FIG. 1A depicts a conceptual diagram of an example system in which a controller may provide search functionality to a user device that is accessing a spreadsheet.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to enabling spreadsheet search functionality, while more particular aspects of the present disclosure relate to searching identified subsections of a spreadsheet for identified values of the spreadsheet. While the present disclosure is not necessarily limited to such applications, various aspects of the disclosure may be appreciated through a discussion of various examples using this context.

As our ability to gather data and the robustness of the tools that store this data increase, individual collections of data within specific files is increasing in kind. For example, data files such as spreadsheets may store massive amounts of data within tens of thousands of cells across hundreds of rows and columns between dozens of pages, and all within a single spreadsheet file. Depending upon the spreadsheet, values may be repeated numerous times across a great magnitude of columns, rows, and pages. For example, a spreadsheet can relate to product development and release cycles, and values such as dates, costs, features, or the like may be repeated numerous times throughout a spreadsheet, whether related to the same thing or different thing.

Spreadsheets provide numerous options for users to manipulate data. For example, in many cases a system may automatically import data into cells of a spreadsheet, after which the data is calculated via operations within the spreadsheet, and then further the spreadsheet may present data via a plurality of charts, pivot tables, or the like. In many cases spreadsheets may have some data that is pulled directly from one or more external sources, while other data is manually provided and/or updated to test various concepts to which the spreadsheet is related.

In some examples, a user may have a desire to find a set of a values of a spreadsheet. For example, a user may want to check numbers that are associated with a value, and/or a user may want to replace a current value in a spreadsheet with an updated value to test how different values impact other factors. In some examples, one or more values that a user wants to inspect and/or update may be found at numerous places within a spreadsheet. For example, a spreadsheet may include data relating to products, supply lines, release dates, and the like, where a user is looking to push a date out as related to a single product, such that the user wants to find all instances of that date as associated with that product within the spreadsheet (while avoiding coming across similar dates relating to other products).

However, in a sufficiently large spreadsheet, it may be extremely difficult to find all instances of the value that only relate to the given query of the user. For example, the user may want to avoid finding dates that relate to other products. As such, while conventional products may enable a user to search an entirety of a spreadsheet for a value, such a search may be far too coarse to return only the relevant results of the user.

Some conventional products attempt to help this problem by enabling a user to search only a subset of columns of a spreadsheet. However, for a spreadsheet that includes hundreds of columns across dozens of sheets that a user wishes to search, it may be impracticable for a user to individually provide all columns in which the value is to be found. Further, even when a user can make use of a conventional system to find some or all values of a spreadsheet, it may be difficult or impossible to use a conventional system to differentiate between values within the spreadsheet that are populated in different ways. For example, as mentioned above, a spreadsheet may include a first set of values that are imported from an external source, a second set of values that are calculated and populated by the spreadsheet (e.g., using math and/or operations on values from other cells of the spreadsheet), and a third set of values that are manually input by a user. In many such instances, a user may wish to avoid changing those values that were imported and/or calculated, as changing such an imported or calculated cell may negatively impact an ability for that cell to import or calculate a value in the future (e.g., be deleting the calculation, and/or by breaking the importation path). As such, using conventional systems, if a user wants to search for all values that were manually input, the user may have no way to differentiate between these manually created values and calculated and imported values within the spreadsheet. Rather, the user may instead be forced to wade through all values provided by the conventional spreadsheet application, as the conventional spreadsheet application may be technically unable to distinguish between these values within a search for a user.

Aspects of this disclosure may solve or otherwise address some or all of these problems of conventional systems. A computing component that utilizes a processing unit executing instructions stored on a memory may provide the functionality that addresses these problems, this computing component herein referred to as a controller. This controller may be provided by a plugin of the software application that enables use of the spreadsheet as predominantly described herein, though in other examples the controller may be provided by a standalone computing device. The controller may be configured to search for the value within subsections of the spreadsheet, where this subsection includes less than all rows and less than all columns of the spreadsheet.

The controller may be configured to receive this subsection via a graphical selection of the cells which a user would like the controller to search. For example, the controller may present to a user a representation of the spreadsheet which a user may "click and drag" cells (and/or individually select cells) to identify one or more portions of the spreadsheet to comprise the subsection to be searched for the value. The one or more portions do not need to be contiguous and/or on a single sheet of the spreadsheet.

In some examples, the controller may further be configured to differentiate between cells that are manually provided, cells that are imported from an external location, cells that are calculated, or the like. In certain examples, the controller may be configured to search for cells based on how these cells are related to other cells within the spreadsheet, such as via labels of rows or columns, inclusions within certain charts or tables of the spreadsheet, or the like. For example, the controller may be able to search within a single graphical selection for all cells that match a value that were imported from a specific database while also are currently are being used in a chart.

For example, FIG. 1A depicts environment 100 in which controller 112 of user device 110 provides search functionality for spreadsheet 116 as accessed via spreadsheet application 114. User device 110 may include a computing device, such as computing system 200 of FIG. 3 that includes a processor communicatively coupled to a memory that includes instructions that, when executed by the processor, causes user device 110 (including controller 112) to execute one or more operations described below. For example, user device 110 may be a laptop, desktop computer, tablet, smart phone, or the like.

As described herein, controller 112 may be a plugin for spreadsheet application 114, such that controller 112 integrates into spreadsheet application 114 and supplements functionality of spreadsheet application 114 to provide the search functionality described herein. In other examples, functionality of controller 112 may be integrated into spreadsheet application 114 as an initial package of spreadsheet application 114. In other examples (not depicted), controller 112 may provide some or all of the search functionality described herein from a remote computing device that is remote from user device 110, such as from a remote computing device that accesses user device 110 over network 130.

Network 130 may include a computing network over which computing messages may be sent and/or received. For example, network 130 may include the Internet, a local area network (LAN), a wide area network (WAN), a wireless network such as a wireless LAN (WLAN), or the like. Network 130 may comprise copper transmission cables, optical transmission fibers, wireless transmission, routers, firewalls, switches, gateway computers and/or edge servers. A network adapter card or network interface in each computing/processing device (e.g., user device 110, databases 120, a remote computing device as described above) may receive messages and/or instructions from and/or through network 130 and forward the messages and/or instructions for storage or execution or the like to a respective memory or processor of the respective computing/processing device. Though network 130 is depicted as a single entity in FIG. 1A for purposes of illustration, in other examples network 130 may include a plurality of private and/or public networks over which user device 110 may receive spreadsheet data and/or controller 112 may receive data in order for controller 112 to manage spreadsheet search functionality as described herein.

Figure 1B:
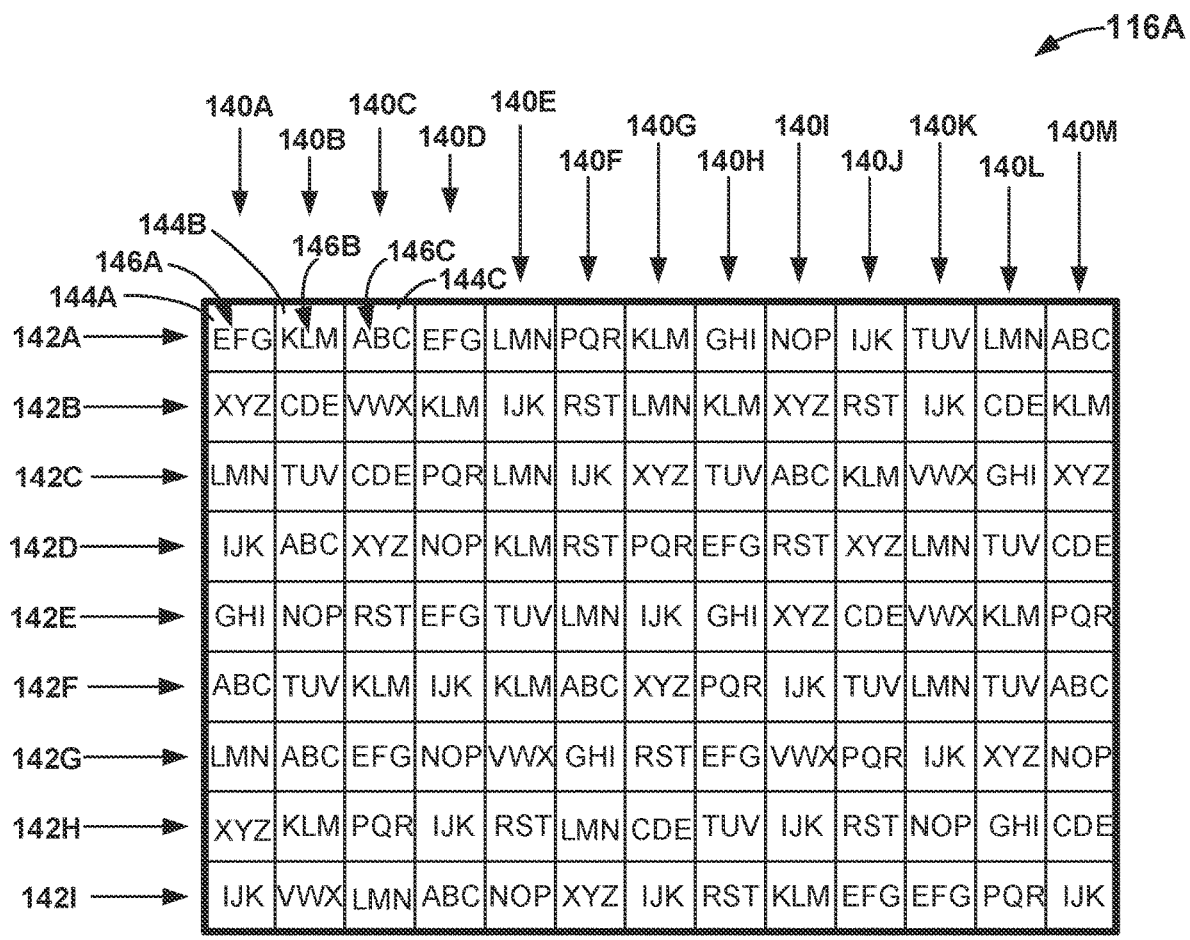
FIG. 1B depicts a conceptual diagram of an example spreadsheet for which the controller of FIG. 1A may provide search functionality.

Spreadsheet 116 may include a plurality of cells with unique and/or shared values that comprise a plurality of rows and columns. User device 110 may display spreadsheet 116 (and user interfaces as described herein) on display 118, which may be any computer display or monitor as known by one of ordinary skill in the art that is consistent with this disclosure. For example, FIG. 1B depicts an example spreadsheet 116A. As used herein, spreadsheet 116A of FIG. 1B is a single example of what spreadsheet 116A may include. Spreadsheet 116A is depicted to aid discussion of the present disclosure, such that as used herein spreadsheet 116 may be interpreted as a broader genus of which spreadsheet 116A is a single nonlimiting species.

Spreadsheet 116A includes a plurality of columns 140A-140M (collectively referred to herein as "columns 140") and a plurality of rows 142A-142I (collectively referred to herein as "rows 142). Columns 140 intersect with rows 142 to define cells 144A-144C (collectively, along with cell 144D of FIG. 2A, referred to as "cells 144"), which are depicted in FIG. 1A (but are not required to) include values 146A-146C (collectively, along with value 146D of FIG. 2A, referred to as "values 146"). For purposes of clarity, only three of the 117 cells 144 and values 146 are labeled in FIG. 1B, though it is to be understood that when used collectively cells 144 and values 146 refer to all cells 144 and values within spreadsheet 116A.

As would be understood by one of ordinary skill in the art, spreadsheet 116A may include substantially any number of columns 140, rows 142, and cells 144. Further, as would be understood by one of ordinary skill in the art, some utility of the current disclosure may increase as a size of spreadsheet 116 increases, as it may be harder for a user to find particular values 146 in a larger spreadsheet 116 (e.g., a spreadsheet 116 with hundreds or thousands of both columns 140 and rows 142, potentially spread across dozens of sheets). As such, the functionality of controller 112 in enabling a user to search with greater specificity and granularity enables a user to identify a set of values that a conventional spreadsheet solution might be unable to identify and provide via a user search. Or, put differently, conventional spreadsheet solutions may lack the technical capability to conduct a user-directed search for a set of values 146 with the level of granularity discussed herein, and aspects of this disclosure such as the functionality of controller 112 provide this technical capability.

Spreadsheet 116 and may include substantially any type of values 146. For example, values 146 may include numbers, dates, letters, or the like. Values 146 may be stored in a plurality of fonts, colors, or other formats. In some examples, controller 112 may be configured to search for values 146 that are in one or more of these formats.

Values 146 may have a variety of sources, where a source indicates a manner with which values 146 were generated and/or received. For example, some values 146 may be manually provided (e.g., typed or pasted in) by a user into respective cells 144, such that the source is a human user manually providing these values 146 into respective cells 144 using spreadsheet application 114. For another example, some values 146 may be calculated using logical and/or mathematical operations relating to other values 146 of other cells 144, such that the source is this calculation that is internal to spreadsheet 116. For example, value 146C of cell 144C of spreadsheet 116A may be calculated via a mathematical equation of a sum (e.g., an addition equation) of values 146A, 146B of cells 144A, 144B (e.g., or a product (a multiplication equation) of values 146A, 146B of cells 144A, 144B, etc.). For another example, value 146C of cell of spreadsheet 116A may be calculated via a logical operation. An example of a logical equation includes where value 146C is whichever of values 146A, 146B of cells 144A, 144B is numerically larger (e.g., if value 146A is 10 and value 146B is 20, then value 146C would be 20 as 20 is larger than 10). As would be understood by one of ordinary skill in the art, these are two very simple mathematical and logical calculations, and far more complex mathematical and/or logical calculations may be used in other embodiments that are consistent with this disclosure.

For another example, some values 146 may have a source that is external to user device 110. For example, values 146 may be imported from one or more databases 120 using a technique such as an application programming interface (API) or the like. Using such an importation tool, cells 144 of spreadsheet 116A may receive values 146 of various types (e.g., stock prices, environmental measurement numbers, supply line numbers) that may be either public or private in origin. These imported values may be received from database 120 that user device 110 has access to (e.g., authorized access over network 130). A user can set up spreadsheet 116 such that these numbers are periodically or continually imported from database 120 as values 146 at predefined cells 144 (e.g., at cells 144 according to a set of rules of spreadsheet 116 and/or of the importing API).

Controller 112 may determine these sources of values 146. For example, controller 112 may determine a source of a respective cell 144 by evaluating logic of spreadsheet 116 to see that, e.g., calculations are configured to determine a respective value 146. For another example, controller 112 may determine a source for given cells 144 to be one or more databases 120 by evaluating an API and/or logic of spreadsheet 116A that defines/constrains/formats how data from databases 120 is to be inserted and identifying that these cells 144 are specified as a destination for the imported data. In some examples, controller 112 may determine that a source is a user manually inputting respective values 146 by identifying an absence of a calculation and/or importation rule that applies to respective cells 144 of these values 146.

As depicted in FIG. 1B, some values 146 of spreadsheet 116A may be in numerous cells 144. For example, value 146A of "EFG" which is in cell 144A is also found at an intersection of column 140C and row 142G, intersections of column 140D and rows 142A, 142E, intersections of column 140H and rows 142D, 142G, an intersection of column 140J and row 142I, and an intersection of column 140J and row 142I. Though value 146A is only found eight times in spreadsheet 116A, in other examples some values 146 may be found in dozens or hundreds of times across thousands or tens of thousands of cells 144, such that it may be extremely difficult for a user to quickly find (much less replace) all of these cells 144.

Controller 112 may receive a command to search for value 146A in a subsection of spreadsheet 116A, where the subsection of spreadsheet 116A includes less than all cells 144 of spreadsheet 116A. In some examples, the subsection includes less than all rows 142 as well as less than all columns 140, such that at least one of columns 140 and at least one of rows 142 is not included in the subsection.

Controller 112 may receive the command to search for value 146A in a subsection by first receiving value 146A for search in response to which controller 112 offers an option to select the subsection, and/or controller 112 may receive the command to search for value in a subsection by first receiving a subsection for search in response to which controller 112 offers an option to select value 146A. Controller 112 may receive value 146A for search in any manner that is consistent with this disclosure. For example, controller 112 may receive value 146A for search by a user selecting cell 144A within spreadsheet 116A and right clicking and selecting an option that says find or replace, as discussed below. For another example, controller 112 may receive value 146A for search by a user navigating into a menu of spreadsheet application 114, selecting a search option, and then inputting value 146A within a field of this menu of spreadsheet application 114.

Similarly, controller 112 may receive a subsection (in response to which controller 112 provides an option for a user to provide value 146A) via a user selecting a set of cells 144 within spreadsheet 116A that are to comprise subsection and "right clicking" a computer mouse coupled to user device 110, where right clicking on the set of cells 144 causes controller 112 to graphically provide a search option. Alternatively, or additionally, controller 112 may receive a subsection to start a search functionally via a user navigating into a menu of spreadsheet application 114, selecting a search option, and then selecting subsection in a manner consistent with this disclosure via fields of this menu of spreadsheet application 114.

Figure 2A:
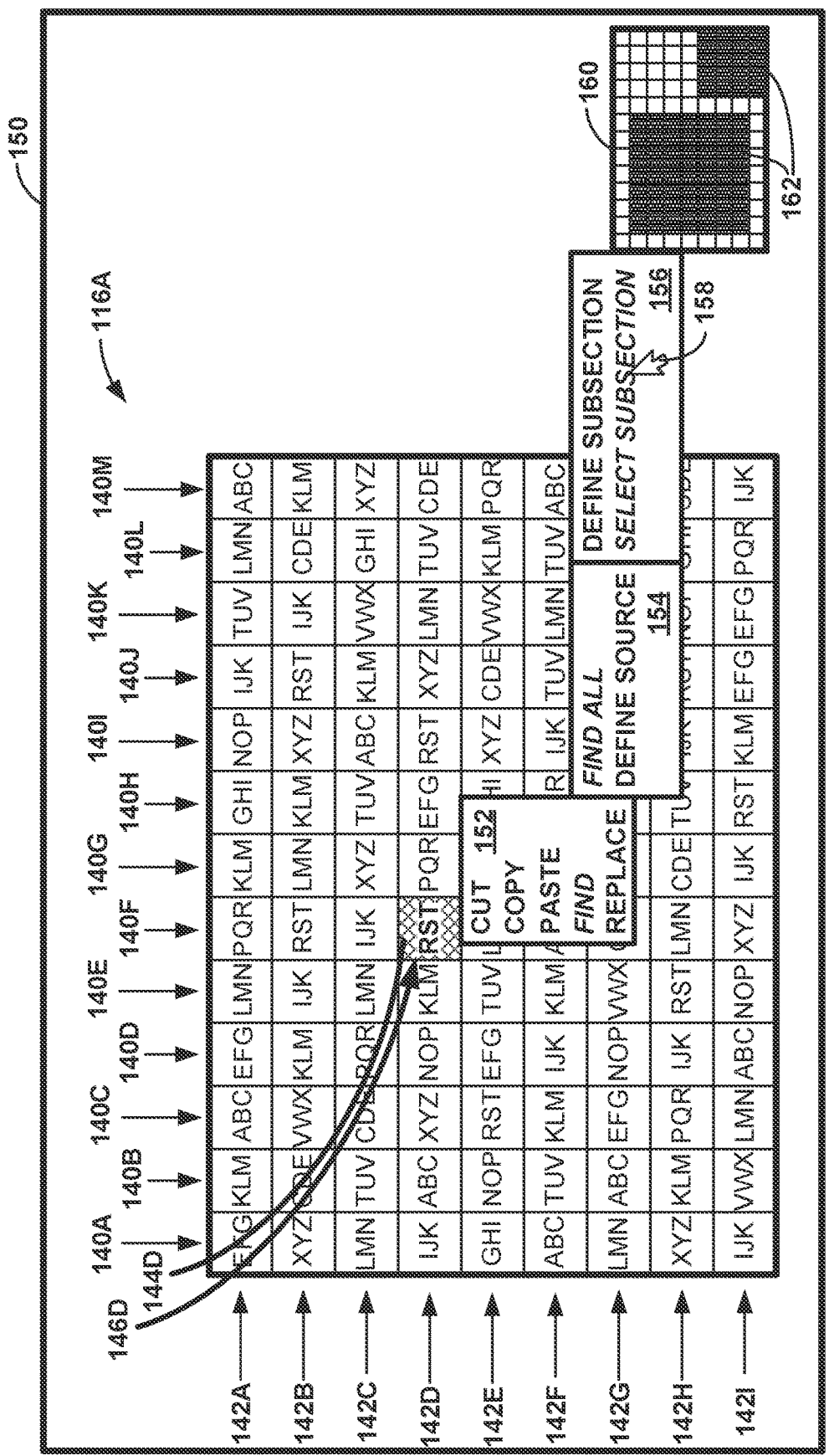
FIG. 2A depicts a conceptual diagram of an example user interface within which the controller of FIG. 1A is providing options to search a spreadsheet via subsections of the spreadsheet.

For example, FIG. 2A depicts an example user interface 150 that depicts spreadsheet 116A as a user is selecting value 146D of cell 144D at intersection of column 140F and row 142D. A user may have selected this cell 144D via left clicking cell 144D via a mouse coupled to user device 110 and then right clicking with this mouse to bring up menu 152 (but not submenus 154, 156, or graphical representation 160 of spreadsheet 116A). It is to be understood that the specific placement of menu 152 (and the placement of submenus 154, 156 and graphical representation 160) and the specific options within menu (as well as the specific options within submenus 154, 156) are provided for purposes of illustration only, and that other placements and options that are consistent with this disclosure are also contemplated.

Menu 152 includes example options of "FIND" as well as "REPLACE". Both options may cause controller 112 to locate all cells 144 that match the provided value 146D within the subsection according to the parameters of the search (e.g., with the specified source, in a specific format, in respective columns 140 that include a specific tag, etc.), but the "replace" option may additionally cause controller 112 to replace value 146D within the returned cells with a new value provided by the user. Controller 112 may replace value 146D of all of these cells 144 with the new value in a single operation, and/or controller 112 may give the user an option to view and/or evaluate every single cell 144 that includes value 146D prior to changing this cell to include the respective new value.

As indicated in FIG. 2A (e.g., indicated by "FIND" option being italicized), a user selected the "FIND" option, in response to which controller 112 presents submenu 154 (e.g., such that controller 112 does not present submenu 154 until a user selects a "FIND" option, and would present a different submenu if a user selected a different option from menu 152). As depicted, submenu 154 relates to finding value 146D. As depicted, submenu 154 may provide an option to "FIND ALL" cells 144 that contain values 146D as well as an option to "DEFINE SOURCE" of cells 144 that contain values 146D that controller 112 is to find. If a user selects the define source option, the owner may select whether controller 112 is to find cells 144 that are manually entered, calculated mathematically, calculated logically, imported, and/or have some other source that is consistent with this disclosure.

As indicated in FIG. 2A (e.g., indicated by "FIND ALL" being italicized), a user selected the "FIND ALL" option, in response to which controller 112 presents submenu 156 (e.g., such that controller 112 does not present submenu 156 until a user selects the "FIND ALL" option, and would present a different submenu if a user selected a different option from submenu 154). As depicted, submenu 156 provides an option to "DEFINE SUBSECTION" or to "SELECT SUBSECTION". A user may define a subsection by, e.g., entering a subset of columns 140 and/or rows 142 that are to comprise the subsection. In some examples, a user may define a set of columns 140 and/or rows that are to be excluded from the subsection. Controller 112 may provide a set of fields within a submenu (not depicted) within which a user can enter rows 142 and columns 140 that are to define the subsection (e.g., whether by their presence or absence within the subsection).

As indicated in FIG. 2A (e.g., indicated by "SELECT SUBSECTION" being italicized and cursor 158 hovering over the "SELECT SUBSECTION" option), a user selected the "SELECT SUBSECTION" option, in response to which controller 112 presents graphical representation 160 of spreadsheet 116A (e.g., such that controller 112 does not present graphical representation 160 until a user selects the "SELECT SUBSECTION" option, and would present a different submenu related to defining a subsection if a user selected the "DEFINE SUBSECTION" option from menu 156). Graphical representation 160 may be a depiction of spreadsheet 116A that is sized within user interface 150 such that all cells 144 of spreadsheet 116A that contain values 146 are depicted. In some examples, graphical representation 160 may include some labels to assist the user, such as a labeling of columns 140 or rows 142, and/or some titles that are associated with columns 140 or rows 142. In certain examples, labels may "pop up" within user interface 150 for evaluation in response to cursor 158 hovering over a given cell 144 (e.g., a label that identifies respective title associated with both a respective column 140 and a respective row 142 of that cell 144).

Controller 112 enables a user to select cells 144 of graphical representation 160 in order to select subsection 162 within which controller 112 is to search for value 146D. Controller 112 may enable a user to individually select cells 144 of graphical representation 160 in order to add (or remove) these cells 144 from subsection 162. Additionally, or alternatively, controller 112 may enable a user to click-and-drag cells 144 of graphical representation 160 in order to add (or remove) the cells 144 from subsection 162. As depicted, subsection 162 may include groups of cells 144 contiguous (e.g., as row 1401 separates two portions that comprise subsection 162. In some examples (not depicted), controller 112 may enable a user to further switch to different sheets or pages of spreadsheet 116A to select additional portions that are to comprise subsection 162.

Figure 2B:
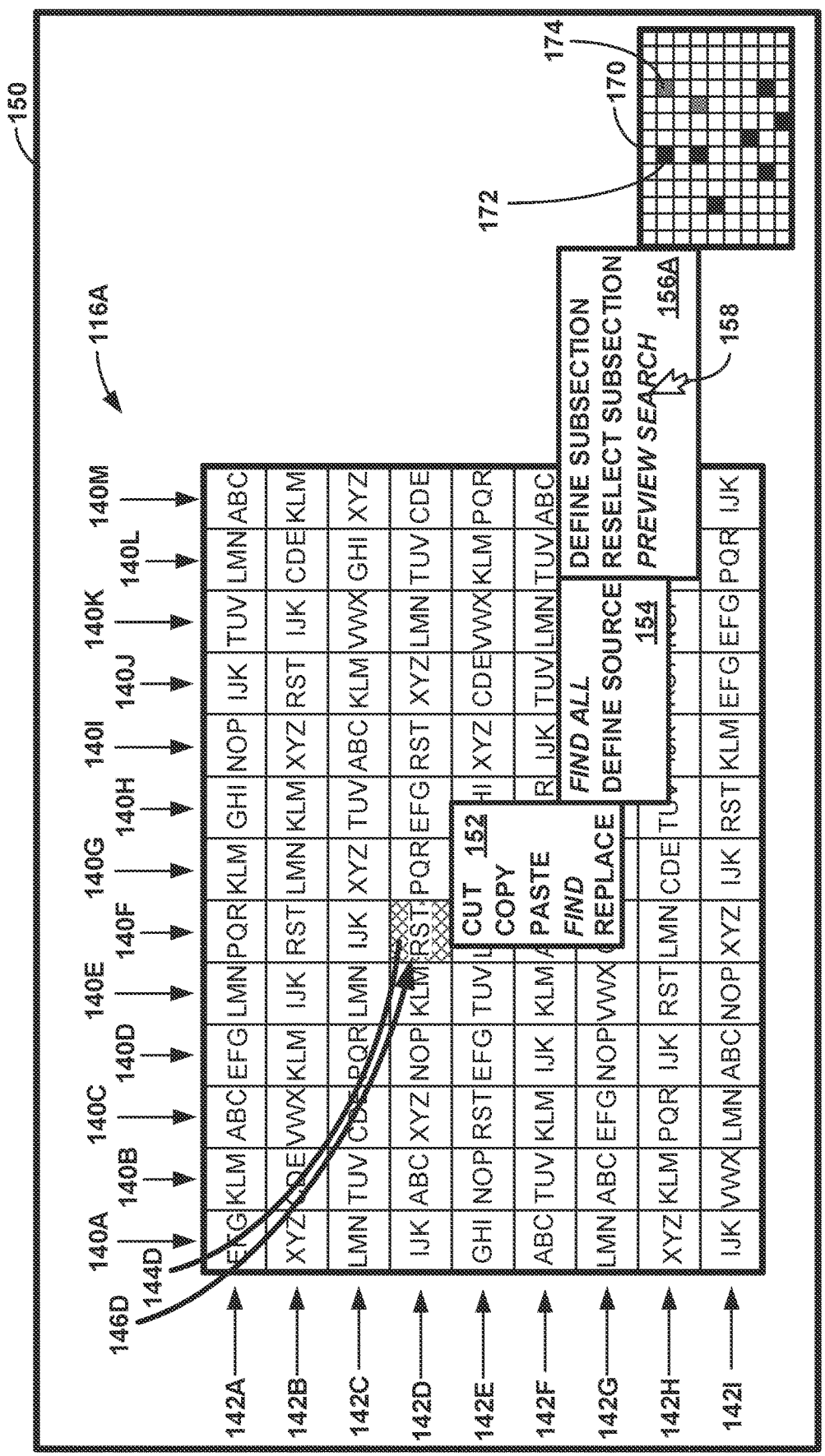
FIG. 2B depicts a conceptual diagram of an example user interface within which the controller of FIG. 1A is providing results of a search via a minimized graphical representation of an entirety of the spreadsheet.

In some examples, after controller 112 has received both value 146D and subsection 162 and found all cells 144 within subsection 162 that include the value 146D (and are from the defined source(s), as applicable), controller 112 may provide a preview of these cells 144 to user. For example, FIG. 2B depicts an updated submenu 156A of previous submenu 156A that includes a new option "PREVIEW SEARCH". As depicted in FIG. 2B, a user has selected the "PREVIEW SEARCH" option resulting in a minimized graphical representation 170 of spreadsheet in which all cells 172 that include value 146D within subsection 162 (e.g., and are from the defined source(s)) are indicated (e.g., indicated as blacked out in FIG. 2B). Controller 112 may minimize spreadsheet 116A within minimized graphical representation 170 such that most or all of spreadsheet 116A is visible within graphical representation 170 (e.g., even if spreadsheet includes many thousands of columns 140, rows 142, and or sheet (in which case controller 112 may display sheets adjacent each other)). By indicating all cells 172 within graphical representation 170 that include value 146D within subsection 162, controller 112 improves an ability of spreadsheet application 114 to enable a user to perform a refined search for values (e.g., as a user may be able to identify that a search is or isn't in the correct place, by identifying which values are included).

In some examples, controller 112 may generate graphical representation 170 such that graphical representation of the search also indicates one or more cells 174 that contained value 146D but were not within subsection 162 (and/or were not from the defined source(s), as applicable). Controller 112 may indicate these cells 174 that are not within the confines of the search in a different manner so that a viewer may quickly distinguish these cells 174 from cells 172 that are to be returned as part of the search. By configuring controller 112 to indicate cells 172 that contain value 146D but are not within subsection 162 (and/or were not from the defined source), controller 112 may improve an ability of spreadsheet application 114 to provide a surgical search for values.

Figure 3:
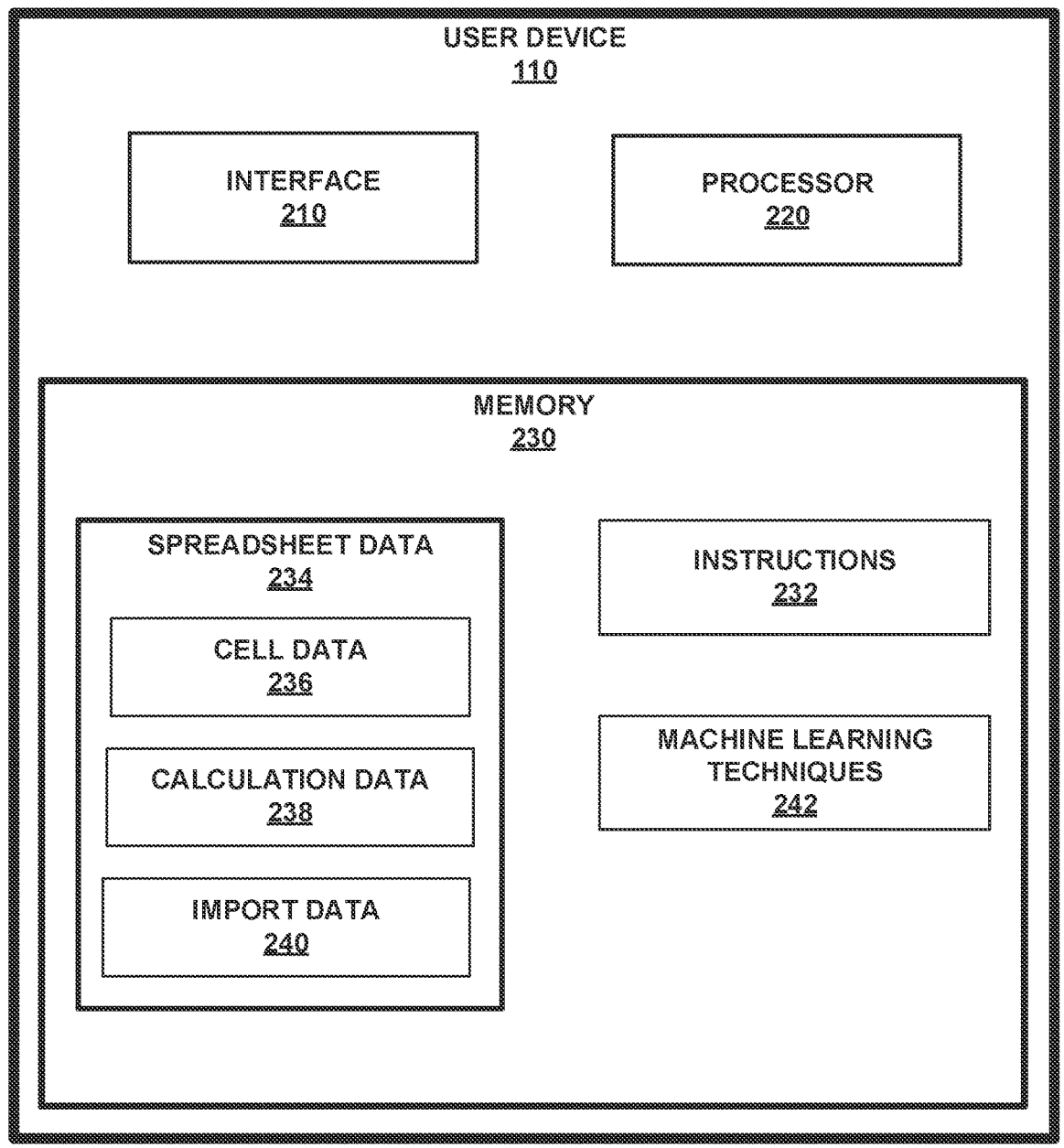
FIG. 3 depicts a conceptual box diagram of example components of a computing device that includes the controller of FIG. 1A.

As described above, controller 112 may include or be part of a computing device that includes a processor configured to execute instructions stored on a memory to execute the techniques described herein. For example, FIG. 3 is a conceptual box diagram of such computing system 200, which, as depicted, may be equivalent to user device 110.

While computing system 200 is depicted as a single entity (e.g., within a single housing) for the purposes of illustration, in other examples, computing system 200 may include two or more discrete physical systems (e.g., within two or more discrete housings). Computing system 200 may include interface 210, processor 220, and memory 230. Computing system 200 may include any number or amount of interface(s) 210, processor(s) 220, and/or memory(s) 230.

Computing system 200 may include components that enable controller 112 and/or spreadsheet application 114 to communicate with (e.g., send data to and receive and utilize data transmitted by) devices that are external to computing system 200. For example, computing system 200 may include interface 210 that is configured to enable controller 112 and/or spreadsheet application 114 to communicate with entities external to computing system 200. Specifically, interface 210 may be configured to enable components of computing system 200 to communicate with databases 120 or the like. Interface 210 may include one or more network interface cards, such as Ethernet cards and/or any other types of interface devices that can send and receive information. Any suitable number of interfaces may be used to perform the described functions according to particular needs.

As discussed herein, computing system 200 may be configured to provide search functionality for spreadsheets. Computing system 200 may utilize processor 220 to thusly provide spreadsheet search functionality. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to provide search functionality of spreadsheets as described herein.

Processor 220 may provide search functionality for spreadsheets according to instructions 232 stored on memory 230 of computing system 200. Memory 230 may include a computer-readable storage medium or computer-readable storage device. In some examples, memory 230 may include one or more of a short-term memory or a long-term memory. Memory 230 may include, for example, random-access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may provide spreadsheet search functionality as described herein according to instructions 232 of one or more coded programs (e.g., plugins or software applications) stored in memory 230 of user device 110.

In addition to instructions 232, in some examples gathered or predetermined data or techniques or the like as used by processor 220 to provide spreadsheet search functionality as described herein may be stored within memory 230. For example, memory 230 may include spreadsheet data 234, which may include data relating to the construction of and relationships within spreadsheet 116. For example, spreadsheet data 234 may include data on the formatting of columns 140 and rows 142, including any titles, charts, or graphics therein. Spreadsheet data 234 also includes cell data 236, which may include all of values 146 of spreadsheet 116. Spreadsheet data 234 may also include calculation data 238, which may include one or both of logical and mathematical calculations that are used to populate values 146 for cells 144. Further, spreadsheet data 234 may include import data 240, which may include data on values 146 that are coming from databases 120 that are external to user device 110. As discussed herein, controller 112 may use import data 240 and/or calculation data 238 (and/or an absence thereof) to determine whether values 146 of spreadsheet 116 were manually entered by a user, calculated using other values 146 of other cells 144, or imported from external sources.

Memory 230 may further include machine learning techniques 242 that controller 112 may use to improve a process of searching for values 146 of spreadsheets 116 as discussed herein over time. Machine learning techniques 242 can comprise algorithms or models that are generated by performing supervised, unsupervised, or semi-supervised training on a dataset, and subsequently applying the generated algorithm or model to suggest search parameters and/or utilize search parameters in providing minimized representations of search results. Using these machine learning techniques 242, controller 112 may improve an ability to suggest and/or receive values that a user wants to search for over time. For example, controller 112 may even learn different preferences of different users, such as preferred parameters of how to search and/or a preferred location of the subsection, and therein suggest these parameters or subsections to a user during use.

Machine learning techniques 242 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 242 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 4:
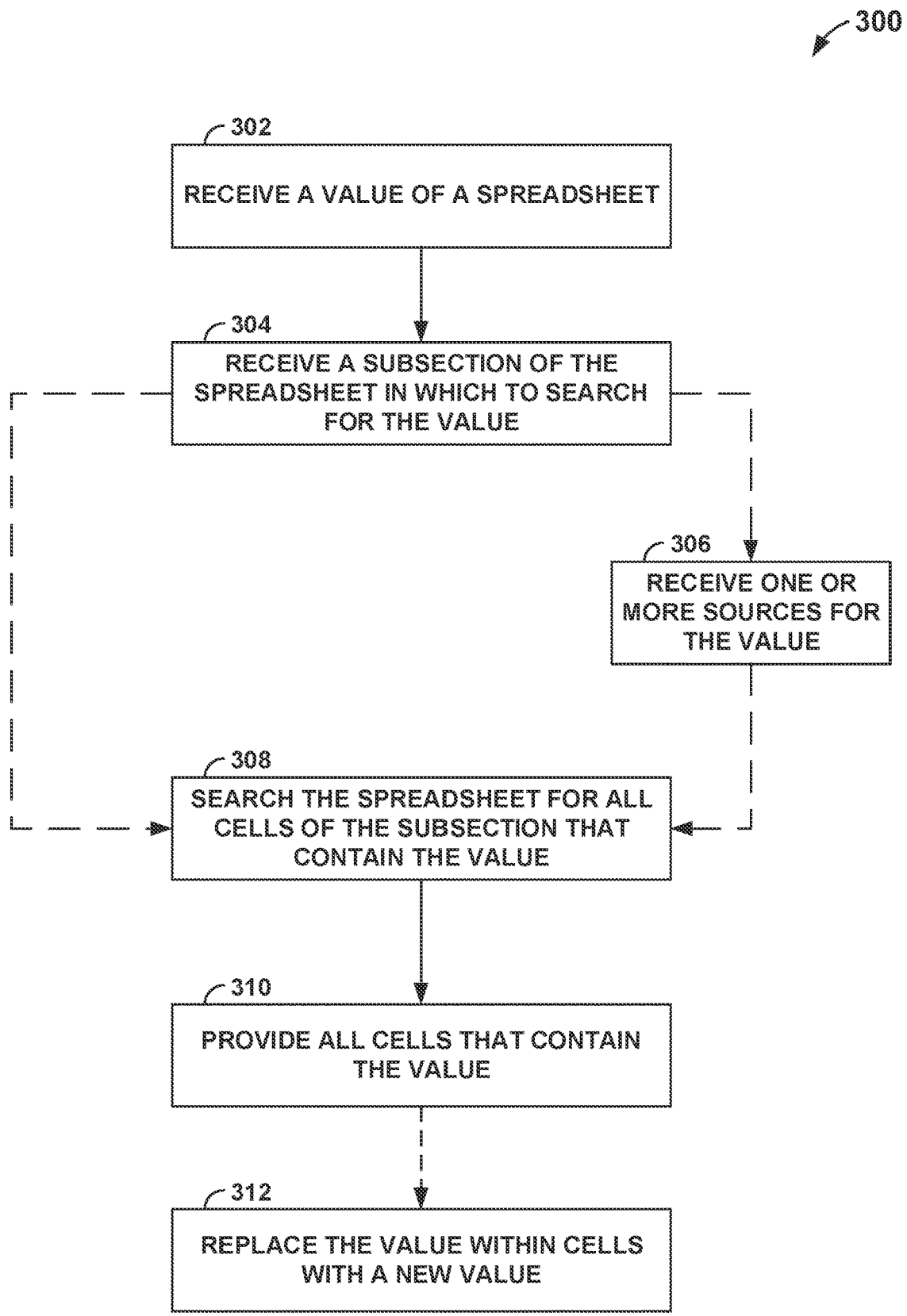
FIG. 4 depicts an example flowchart by which the controller of FIG. 1A may provide search functionality for a spreadsheet.

Using these components, controller 112 may provide search functionality as discussed herein. For example, controller 112 may provide search functionality for spreadsheets according to flowchart 300 depicted in FIG. 4. Flowchart 300 of FIG. 4 is discussed with relation to FIGS. 1A and 1B for purposes of illustration, though it is to be understood that other systems may be used to execute flowchart 300 of FIG. 4 in other examples. Further, in some examples controller 112 may execute a different method than flowchart 300 of FIG. 4, or controller 112 may execute a similar method with more or less steps in a different order, or the like.

Flowchart 300 begins with controller 112 receiving value 146 of spreadsheet 116A. Controller 112 may receive this value 146 via a user selecting a respective cell 144 that contains that value 146. Alternatively, controller 112 may receive that value 146 via a user entering that value 146 within a menu of spreadsheet application 114.

Controller 112 receives a subsection of spreadsheet 116A within which controller 112 is to search for cells 144 that contain this value 146 (304). Controller 112 may provide an option to select the subsection in response to receiving value 146 (302). Controller 112 may provide this option graphically on display 118 of user device 110. In other examples (not depicted in flowchart 300), controller 112 may provide an option for a user to select value 146 (302) in response to a user providing the subsection (304). The subsection may include less than all columns 140 and rows 142 of spreadsheet 116A. Put differently, there may be at least one column 140 and at least one row 142 of spreadsheet 116A that are both not within subsection.

In some examples, controller 112 may receive one or more sources (306) for value 146. Specifically, controller 112 may receive sources for value 146 that are acceptable to include in search results, and/or controller 112 may receive sources for value 146 that are not acceptable to include in search results. For example, controller 112 may receive a source of "manually entered," such that controller 112 is to only provide values 146 that were manually entered (and not provide results that were calculated and/or imported).

In some examples, in addition to a source, controller 112 may receive one or more other characteristics or parameters for the identified value 146 for which the user wants to search. For example, a user may want to find all values corresponding to a current start date of a project "alpha," while avoiding all values corresponding to a current start date of a project "omega," even though both of these projects currently have the same start date (and therein the same value) and are within the same subsection. As such, the user may provide controller 112 with an additional search parameter that relates to, e.g., a label of columns 140, such as specifying that the columns 140 must include a tag associated with "alpha," and/or cannot include a tag associated with "omega". Controller 112 may alternatively, or additionally, receive other search parameters relating to a label of rows 142, or relating to metadata of cells 144 themselves, or the like.

For example, controller 112 may provide an option to a user to select such search criteria relating to interrelations of the spreadsheet 116 by including an option within submenu 154 of FIGS. 2A and 2B. This additional option as provided by controller 112 may enable a user to define additional search parameters to be used by controller 112, where these additional search parameters may not relate to a respective value 146 of a respective cell 144 being searched, but rather the search parameters relate to using data or metadata of cells 144 that are related (e.g., by virtue of being in a same row 142, or in a same column 140, or being used in a same chart, or the like) to the respective cell 144. By enabling spreadsheet application 114 to conduct such a surgical search for cells 144 that contain values 146 with numerous characteristics regarding interrelations of data within spreadsheet 116A, controller 112 may improve an ability of spreadsheet application 114 to manage and handle massive amounts of data of spreadsheets 116.

Controller 112 searches spreadsheet 116A for all cells 144 of the subsection that contain the received value 146 (308). Where controller 112 received a preferred or prohibited source (306), controller 112 only returns results that had a source that corresponds to this preference or prohibition. Alternatively, where controller 112 does not receive a preferred or prohibited source, controller 112 returns all cells 144 within subsection that contain the received value 146. Given that controller 112 may do either of these two paths (304 to 306 to 308, or 304 straight to 308) depending upon the parameters received from the user, flowchart 300 includes a dashed line across these two paths, as both are not required (though, obviously, flowchart 300 may always go through one or the other).

Further, in examples where controller 112 received search parameters that related to other data or metadata of cells 144 (e.g., a required or prohibited title of cells 144), controller 112 may search for only those cells 144 that satisfied these search parameters. For example, if controller 112 receives a search parameter to exclude cells 144 that are currently depicted within a given chart, controller 112 may only include those cells 144 that are not used to generate the display of that chart.

Controller 112 may provide all cells 146 within the subsection that contain the identified value 146 (310). For example, controller 112 may present a list of all cells 146 within subsection that contain the identified value 146. For another example, controller 112 may present a first cell 144 of the subsection that contains the identified value 146 with an option to go to a second (and third, and fourth, etc.) cell 144 of the subsection that also contains the identified value 146, so that a user may navigate around spreadsheet 116A to view (and/or update, as desired) each of these cells 144 of the spreadsheet 116A. Where spreadsheet 116A is too big to fit within a user interface of display 118, controller 112 may navigate around spreadsheet 116A in displaying these cells 144, such that the user always has the identified cell 144 on display 118.

In some examples, controller 112 may also replace some or all identified values 146 within cells 144 of subsection with a new value (312). Controller 112 may receive a command to replace the identified value 146 within all cells 144 of subsection with the new value, in response to which controller 112 may simultaneously replace all of the identified values 146 with the provided new value. Alternatively, controller 112 may present each cell 144 with the identified value 146 to the user for the user to decide if controller 112 is to replace the identified value with the new value.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a value of at least one cell of a spreadsheet that includes data across a plurality of rows and a plurality of columns;
receiving a source of the value;
receiving a subsection of the spreadsheet in which to search for the value, where the subsection includes less than all columns and less than all rows of the spreadsheet;
searching the subsection for all cells within the subsection that both contain the value and share the source by evaluating a set of back-end importation rules that governs how some cells of the subsection receive values imported from an external source; and
providing the all cells within the subsection that contain the value and share the source.

2. The computer-implemented method of claim 1, wherein providing all cells within the subsection that contain the value include graphically providing a minimized graphical representation of an entirety of the spreadsheet in which the all cells are indicated.

3. The computer-implemented method of claim 2, wherein the minimized graphical representation indicates at least one cell that contains the value of the spreadsheet outside of the subsection.

4. The computer-implemented method of claim 1, further comprising providing an option to input the value for which the spreadsheet will be searched in response to receiving the subsection.

5. The computer-implemented method of claim 1, further comprising providing an option to search the spreadsheet for the value in response to receiving the value.

6. The computer-implemented method of claim 5, wherein providing the option to search the spreadsheet includes providing an option to graphically click and drag to select cells of the subsection on a representation of the spreadsheet.

7. The computer-implemented method of claim 5, wherein providing the option to search the spreadsheet includes providing an option to enter one or more rows and one or more columns that comprise the subsection.

8. The computer-implemented method of claim 1, further comprising replacing the value with a new value in each of the all cells within the subsection.

9. The method of claim 1, wherein searching the subsection for all cells further includes searching the subsection for all cells that are included within an identified chart or table of the spreadsheet, wherein the providing the all cells includes providing the all cells within the subsection that contain the value and share the source and are included within the identified chart or table.

10. A system comprising:
a processor; and
a memory in communication with the processor, the memory containing instructions that, when executed by the processor, cause the processor to:
receive a value of at least one cell of a spreadsheet that includes data across a plurality of rows and a plurality of columns;
receive a source of the value;
receive a subsection of the spreadsheet in which to search for the value, where the subsection includes less than all columns and less than all rows;
search the subsection for all cells that both contain the value and share the source by evaluating a set of back-end importation rules that governs how some cells of the subsection receive values imported from an external source; and
provide the all cells within the subsection that contain the value and share the source.

11. The system of claim 10, wherein providing all cells within the subsection that contain the value include graphically providing a minimized graphical representation of an entirety of the spreadsheet in which the all cells are indicated.

12. The system of claim 11, wherein the minimized graphical representation indicates at least one cell that contains the value of the spreadsheet outside of the subsection.

13. The system of claim 10, the memory containing additional instructions that, when executed by the processor, cause the processor to provide an option to search the spreadsheet for the value in response to receiving the value, wherein providing the option to search the spreadsheet includes at least one of:
providing an option to graphically click and drag to select cells of the subsection on a representation of the spreadsheet; and
providing an option to enter one or more rows and one or more columns that comprise the subsection.

14. A computer program product, the computer program product comprising a computer readable storage medium having program instructions embodied therewith, the program instructions executable by a computer to cause the computer to:
receive a source of the value;
receive a value of at least one cell of a spreadsheet that includes data across a plurality of rows and a plurality of columns;
receive a subsection of the spreadsheet in which to search for the value, where the subsection includes less than all columns and less than all rows;
search the subsection for all cells within the subsection that both contain the value and share the source by evaluating a set of back-end importation rules that governs how some cells of the subsection receive values imported from an external source; and
provide the all cells within the subsection that contain the value and share the source.

15. The computer program product of claim 14, wherein providing all cells within the subsection that contain the value include graphically providing a minimized graphical representation of an entirety of the spreadsheet in which the all cells are indicated.

16. The computer program product of claim 15, wherein the minimized graphical representation indicates at least one cell that contains the value of the spreadsheet outside of the subsection.

17. The computer program product of claim 14, the readable storage medium having additional program instructions embodied therewith, the program instructions executable by the computer to cause the computer to provide an option to search the spreadsheet for the value in response to receiving the value.

18. The computer program product of claim 17, wherein providing the option to search the spreadsheet includes at least one of:
- providing an option to graphically click and drag to select cells of the subsection on a representation of the spreadsheet; and
- providing an option to enter one or more rows and one or more columns that comprise the subsection.

\* \* \* \* \*